(12) United States Patent
Chopra et al.

(10) Patent No.: US 11,899,823 B2
(45) Date of Patent: Feb. 13, 2024

(54) PRIVACY SAFE ANONYMIZED IDENTITY MATCHING

(71) Applicant: Snap Inc., Santa Monica, CA (US)

(72) Inventors: Samarth Chopra, Santa Monica, CA (US); Amit Datta, Los Angeles, CA (US); Apoorvaa Deshpande, Santa Monica, CA (US); Hooman Javaheri, Los Alamitos, CA (US); Bahador Yeganeh, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 406 days.

(21) Appl. No.: 17/357,559

(22) Filed: Jun. 24, 2021

(65) Prior Publication Data

US 2022/0253555 A1 Aug. 11, 2022

Related U.S. Application Data

(60) Provisional application No. 63/199,998, filed on Feb. 8, 2021.

(51) Int. Cl.
*G06F 21/62* (2013.01)
*G06N 20/00* (2019.01)
(Continued)

(52) U.S. Cl.
CPC ...... *G06F 21/6254* (2013.01); *G06F 16/2255* (2019.01); *G06F 21/6245* (2013.01); *G06M 3/08* (2013.01); *G06N 20/00* (2019.01); *G06Q 30/0241* (2013.01); *G06Q 30/0242* (2013.01); *G06Q 30/0243* (2013.01); *H04L 9/0643* (2013.01); *H04L 63/0421* (2013.01); *H04L 2209/42* (2013.01)

(58) Field of Classification Search
CPC ............. G06F 16/2255; G06F 21/6254; G06F 21/6245; H04L 9/0643; H04L 63/0421; H04L 2209/42; G06Q 30/0241; G06Q 30/0242; G06Q 30/0243; G06N 20/00; G06N 3/08
See application file for complete search history.

(56) References Cited

U.S. PATENT DOCUMENTS 10,169,778 B1 * 1/2019 Collin ................ G06Q 30/0246
2005/0235153 A1 * 10/2005 Ikeda .................... H04L 63/062
713/176

(Continued)

FOREIGN PATENT DOCUMENTS

WO WO-2010091050 A2 * 8/2010 ............. G06Q 30/02

OTHER PUBLICATIONS

Aly, Mohamed, et al. "Web-scale user modeling for targeting." Proceedings of the 21st international conference on world wide web. 2012. (Year: 2012).*

(Continued)

*Primary Examiner* — Michael Simitoski
(74) *Attorney, Agent, or Firm* — Schwegman Lundberg & Woessner, P.A.

(57) ABSTRACT

An example computer-implemented system maintains user profiles and displays external content. Method and system are provided for performing attribution of conversions with respect to the external content in a privacy safe manner by anonymizing personally identifiable information utilizing cryptographic salt.

20 Claims, 5 Drawing Sheets

(51) Int. Cl.
*G06Q 30/0241* (2023.01)
*H04L 9/40* (2022.01)
*H04L 9/06* (2006.01)
*G06Q 30/0242* (2023.01)
*G06F 16/22* (2019.01)
*G06M 3/08* (2006.01)

(56) References Cited

U.S. PATENT DOCUMENTS

| | | | |
|---|---|---|---|
| 2011/0246267 A1* | 10/2011 | Williams | G06Q 30/08 |
| | | | 705/14.4 |
| 2017/0228768 A1* | 8/2017 | Saxena | G06Q 30/0242 |
| 2020/0334708 A1* | 10/2020 | Knox | G06Q 20/123 |
| 2021/0034782 A1* | 2/2021 | Kleber | G06Q 30/0241 |
| 2021/0232701 A1* | 7/2021 | Goel | G06F 21/6254 |
| 2021/0377228 A1* | 12/2021 | Kåberg Johard | G06Q 50/265 |
| 2022/0147650 A1* | 5/2022 | Seth | G06F 21/6254 |
| 2022/0270129 A1* | 8/2022 | Dakic | G06Q 30/0246 |
| 2022/0284114 A1* | 9/2022 | Klein | G06F 21/602 |
| 2022/0376900 A1* | 11/2022 | Wang | H04L 9/008 |
| 2022/0385739 A1* | 12/2022 | Wu | G06Q 30/0251 |

OTHER PUBLICATIONS

Brookman, Justin, et al. "Cross-Device Tracking: Measurement and Disclosures." Proc. Priv. Enhancing Technol. 2017.2 (2017): 133-148. (Year: 2017).*

Zhu, Wen-Yuan, et al. "SEM: A softmax-based ensemble model for CTR estimation in real-time bidding advertising." 2017 IEEE International Conference on Big Data and Smart Computing (BigComp). IEEE, 2017. (Year: 2017).*

* cited by examiner

PRIVACY SAFE ANONYMIZED IDENTITY MATCHING

CLAIM OF PRIORITY

This application claims the benefit of priority to U.S. Provisional Application Ser. No. 63/199,998, filed Feb. 8, 2021, which is incorporated herein by reference in its entirety.

TECHNICAL FIELD

The present disclosure generally relates to data analysis. Specifically, but not by way of limitations, systems and methods herein describe generating attribution data for external content in a privacy safe manner.

BACKGROUND

The popularity of computer-implemented programs that permit users to access and interact with content and other users online continues to grow. Various computer-implemented applications exist that permit users to share content with other users through messaging clients. Some of such computer-implemented applications, termed apps, are installed directly onto a mobile device such as a phone, a tablet, or a wearable device. An app may have a backend service provided on a server computer system to perform operations that may require resources greater than is reasonable to perform at a client device (e.g., storing large amounts of data or performing computationally expensive processing). For example, a messaging client and the associated messaging server system may be configured to permit online users to share content. An app, such as a messaging client, may be configured to display external content that originates from a third party provider, in addition to facilitating content sharing over a network.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
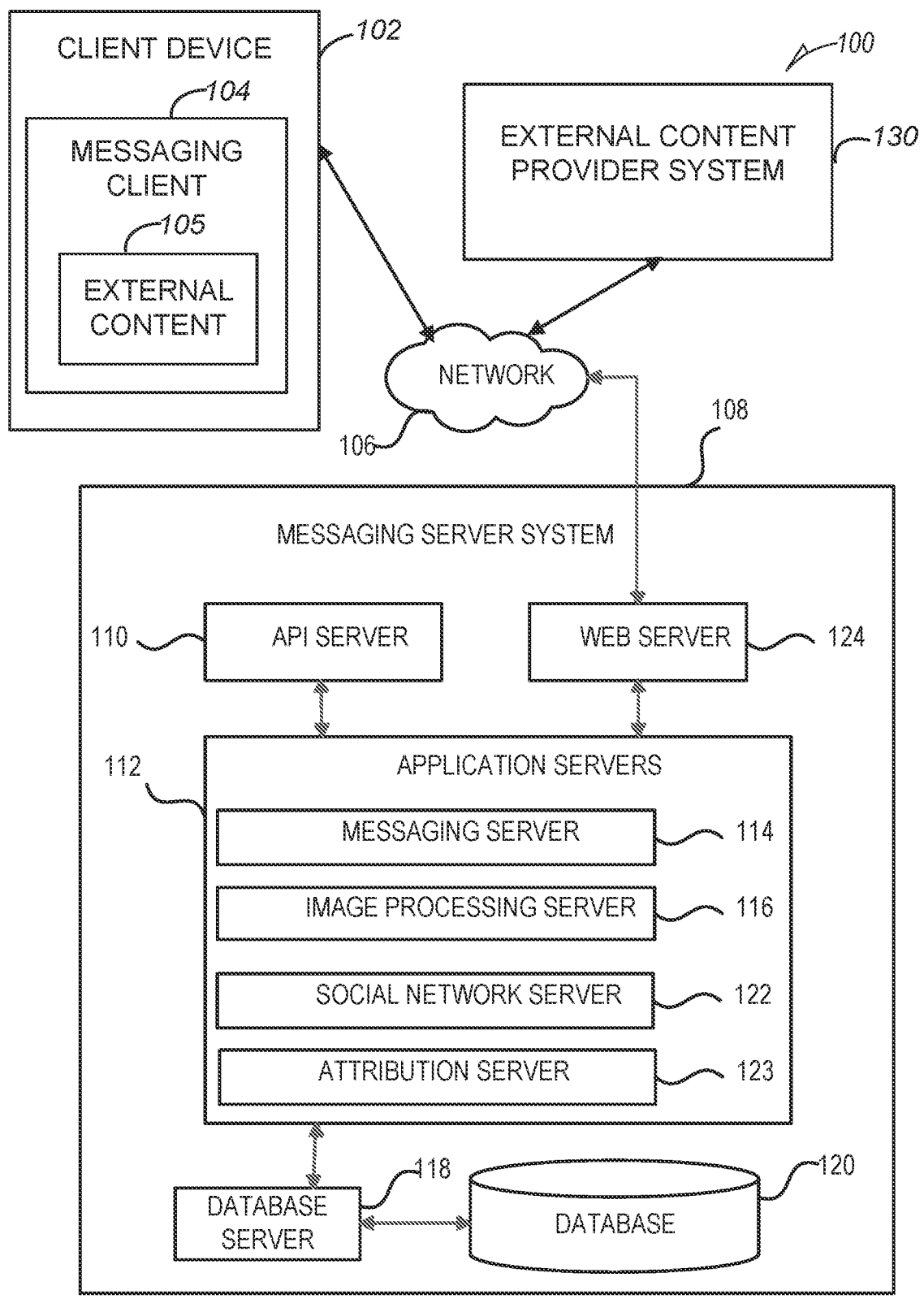
FIG. 1 is a diagrammatic representation of a networked environment in which a privacy safe attribution service may be deployed, in accordance with some examples.

A computer-implemented application, also referred to herein as an app, can display external content, in addition to providing the functionality of the application itself. The external content originates from a third party system and includes content that provides information that may be of interest to a user and/or information that the provider of the third party system would like to make available to a broader audience.

The effectiveness of a given external content item displayed by an app can be measured by detecting and counting events defined as successful outcomes that follow impressions of the given external content within a predefined period of time. An impression, which indicates that an external content item has been presented to a user of an app, is an event associated with fetching an external content item from its source (a third party system system) and displaying it on a screen provided by the app that functions as a delivery system. Information about impressions is stored as impression records. An event defined as a successful outcome that follows an impression within a predefined period of time is referred to as a conversion. Examples of conversions include events indicating downloading of a third party app, subscribing to a newsletter, enrolling into an on-line class, where such events occurred within a predetermined period of time after an associated external content item was displayed to a user of the app.

An attribution process, also referred to as merely attribution, is a process of generating metrics indicative of conversions that follow impressions, such as, for example, how many users that were shown an external content item subsequently performed a certain activity related to the external content item. Collecting user data and/or device data from web and mobile applications, in order to identify conversions, can be deemed undesirable when there is a possibility that personally identifiable information of a user, such as the name of a user or the network address of the user, becomes exposed to a third party provider. An event triggering attribution process is referred to as a conversion request. A conversion request is associated with a specific date—referred to as a conversion date—and with information that can be connected to a specific user, such as an email address or an Internet protocol (IP) address.

The technical problem of performing attribution process, in which the impression records and the conversion requests include personally identifiable information (PII), is addressed by providing a privacy safe attribution system that anonymizes PII from impression records and PII from conversion requests using salt values that are generated and discarded periodically, for example daily. A salt value (or simply salt) is random data, referred to as cryptographic salt, that is used as additional input to a one-way function that hashes an item of personally identifiable information, such as a password or a user identifier for example. Hashed data that was generated using salt can be referred to as salted hash.

At each iteration, which is performed daily for example, the attribution process includes three phases—preprocessing, matching, and reporting. The attribution process is based on the following tenets. Information used in the attribution process that can be connected to a specific user (PII) is anonymized by applying a hash function that uses salt as additional input, such that the matching and reporting can be performed without any access to raw or hashed unique identifiers. Salt values are discarded after the PII from impression records and conversion requests has been anonymized with the salt values and before the matching phase of the attribution process is commenced. A new set of salt values is generated each day by a salt service. The number of salt values generated each day equals the number of days in the predefined attribution window, within which a conversion associated with an external content item can be attributed to an impression within the app with respect to the external content item.

Reporting of the determined attribution is performed at an aggregate level to prevent downstream consumers from inferring PII from individual matched records. Some examples of downstream consumer components include a ranking generator and a lift generator. A ranking generator utilizes the results from past attributions for future optimization of delivering external content by ranking external content items. Rank is a value that is used to determine the position of an external content item relative to other items of external content. A lift generator calculates a measure of success, termed lift, with respect to external content. Lift represents an increase in the desired outcomes in response to impressions with respect to external content. Each downstream consumer component provides one or more bucket definitions to be used by the attribution service and receives aggregate counts of conversions per bucket, each bucket having a minimum number of users. A bucket definition can be in the form of a filter or criteria and an associated bucket identification. For example, a bucket identification Bucket_id$_1$ may be mapped to the age range between 25 and 30 years old, and a bucket identification Bucket_id$_2$ may be mapped to the geographic region California.

Each downstream consumer component can provide to the attribution service a list of non-overlapping bucket definitions. The attribution service tags each impression record with a bucket identification. For example, a unique impression key serve_item_id$_1$ is tagged with bucket_id$_1$ if the user who viewed the content item represented by the impression record is 27 years old; a unique impression key serve_item_i$_2$ is tagged with bucket_id$_2$ if the user who viewed the content item represented by the impression record is from California. The attribution service reports the count of attributed conversions for each bucket.

In order to decrease the confidence of whether any specific user from a given bucket can be tied to a particular conversion, each bucket can be required to have a minimum number of users (the minimum number of user profiles that satisfy the criteria mapped to the bucket identification). In some examples, the attribution service may be configured to underreport the count of attributed conversions if the actual count of attributed conversions for a given bucket equals to the number of users in that bucket, in order to further ensure the users' anonymity.

In some embodiments, the bucket definitions are grouped to form bucket partitions. In order to provide further safeguards against inferring conversion status of specific users from attributed conversion counts reported for all buckets or bucket partitions, the following approach is used. The overall system is treated as a system of equations where the number of bucket partitions, for which the count of attributed conversions is greater than zero is the number of equations (#equations), and the number of impressions in the above equations minus the number of impressions that appear in zero buckets is the number of variables (#variables). For the system to be underdetermined (not be deterministically solvable), the attribution system can be configured to receive an alert when the number of equations reaches a predetermined threshold (80% for example) with respect to the number of variables. In response to the alert, the attribution system adjusts bucket partitions, e.g., by dismantling one or more bucket partitions and moving bucket definitions from dismantled bucket partitions into one or more of the remaining bucket partitions.

In order to help alleviate the computational burden of executing salting and hashing of PII during the attribution process for each bucket, the attribution service, in some examples, creates respective isolated execution environments (IEE) groups of bucket definitions.

The privacy safe attribution process may be used in the context of a messaging system that hosts a backend service for an associated messaging client. A messaging system is described further below with reference to FIG. 1 and FIG. 2. While the privacy safe attribution process is described below in the context of a messaging system, the methodologies described herein can be used advantageously in various computer implemented applications that process conversion data and impression data with respect to external content.

It will be noted that the methodologies described herein may be used with respect to external content, of which ads is just one example. While a privacy safe attribution process is described below in the context of a messaging system, the methodologies described herein can be used advantageously in various computer implemented applications that displays external content and computes metrics reflecting effectiveness of the presentation of the external content in a computer implemented application.

Networked Computing Environment

FIG. 1 is a block diagram showing an example messaging server system 100 for exchanging data (e.g., messages and associated content) over a network. The messaging server system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data). A messaging client 104 allows third party publishers to provide their content, referred to as external content, to the users from within a messaging client 104. A messaging client 104 is shown as displaying external content 105, which is provided by an external content provider system 130. The external content 105 may be content that provides information that may be of interest to a user and/or information that the provider of the external content provider system 130 would like to make available to a broader audience.

The messaging server system 108 provides server-side functionality via the network 106 to a particular messaging client 104. While certain functions of the messaging server system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging server system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120. A web server 124 is coupled to the application servers 112 and provides web-based interfaces to the application servers 112. To this end, the web server 124 processes incoming network requests over the Hypertext Transfer Protocol (HTTP) and several other related protocols. The database 120 stores data associated with messages processed by the application servers 112, such as, e.g., profile data about a particular entity. Where the entity is an individual, the profile data includes, for example, a user name, notification and privacy settings, as well as self-reported age of the user and records related to changes made by the user to their profile data.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, opening an application event (e.g., relating to the messaging client 104), as well as various functions supported by developer tools provided by the messaging server system 108 for use by third party computer systems.

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. The image processing server 116 that is dedicated to performing various image processing operations, typically with respect to images or video within the payload of a message sent from or received at the messaging server 114. The social network server 122 supports various social networking functions and services and makes these functions and services available to the messaging server 114.

Also shown in FIG. 1 is an attribution server 123. The attribution server 123 is configured to facilitate a privacy safe attribution process, which is described in detail further below, at least with respect to FIG. 3.

System Architecture

Figure 2:
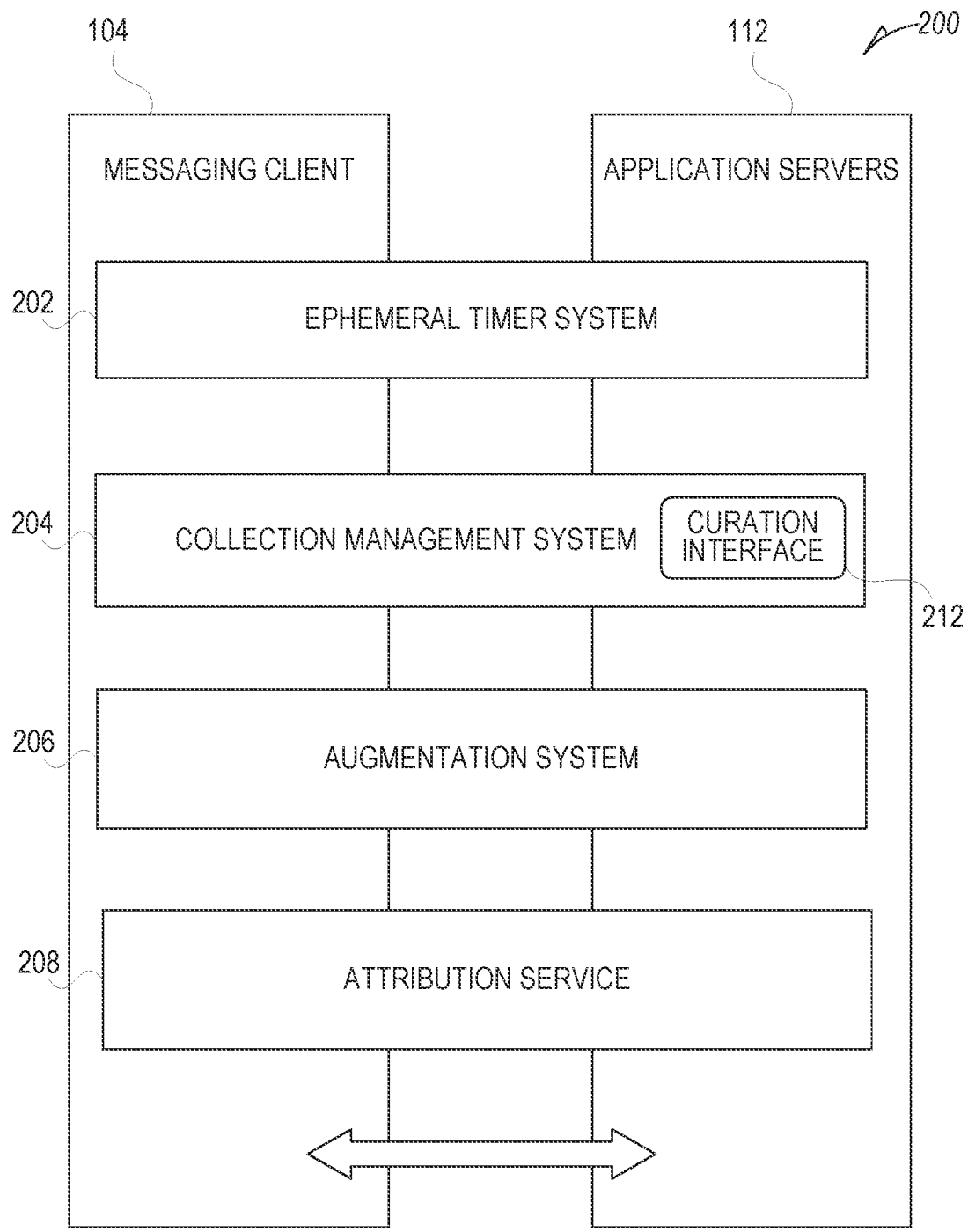
FIG. 2 is a diagrammatic representation of a system, that has both client-side and server-side functionality, configured to provide an attribution service, in accordance with some examples.

FIG. 2 is a block diagram illustrating further details regarding the system 100, according to some examples. Specifically, the system 100 is shown to comprise the messaging client 104, and the application servers 112. The system 100 embodies a number of subsystems, which are supported on the client-side by the messaging client 104, and on the sever-side by the application servers 112. These subsystems include, for example, an ephemeral timer system 202, a collection management system 204, and an augmentation system 206.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image, video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

In some examples, the messaging system may cause presentation of external content provided by the external content provider system 130 by the messaging client 104 after a user viewed a collection and before the next collection is presented.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection.

The augmentation system 206 provides various functions that enable a user to augment (e.g., annotate or otherwise modify or edit) media content, which may be associated with a message. For example, the augmentation system 206 provides functions related to the generation and publishing of media overlays for messages processed by the system 100. The media overlays may be stored in the database 120 and accessed through the database server 118.

In some examples, the augmentation system 206 is configured to provide access to AR components that can be implemented using a programming language suitable for app development, such as, e.g., JavaScript or Java and that are identified in the messaging server system by respective AR component identifiers. An AR component may include or reference various image processing operations corresponding to an image modification, filter, media overlay, transformation, and the like. These image processing operations can provide an interactive experience of a real-world environment, where objects, surfaces, backgrounds, lighting etc., captured by a digital image sensor or a camera, are enhanced by computer-generated perceptual information. In this context an AR component comprises the collection of data, parameters, and other assets needed to apply a selected augmented reality experience to an image or a video feed.

In some examples, the messaging system may cause presentation of external content provided by the external content provider system 130 by the messaging client 104 when a certain AR component is loaded in the messaging client 104.

In some embodiments, an AR component includes modules configured to modify or transform image data presented within a graphical user interface (GUI) of a client device in some way. For example, complex additions or transformations to the content images may be performed using AR component data, such as adding rabbit ears to the head of a person in a video clip, adding floating hearts with background coloring to a video clip, altering the proportions of a person's features within a video clip, or many numerous other such transformations. This includes both real-time modifications that modify an image as it is captured using a camera associated with a client device and then displayed on a screen of the client device with the AR component modifications, as well as modifications to stored content, such as video clips in a gallery that may be modified using AR components.

Various augmented reality functionality that may be provided by an AR component include detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a 3D mesh model of the object or objects, and using transformations and animated textures of the model within the video to achieve the transformation. In other embodiments, tracking of points on an object may be used to place an image or texture, which may be two dimensional or three dimensional, at the tracked position. In still further embodiments, neural network analysis of video frames may be used to place images, models, or textures in content (e.g. images or frames of video). AR component data thus refers to both to the images, models, and textures used to create transformations in content, as well as to additional modeling and analysis information needed to achieve such transformations with object detection, tracking, and placement.

Also shown in FIG. 2 is an attribution service 208. The attribution service 208 provides a privacy safe attribution process, which is described in detail further below.

System Design

Figure 3:
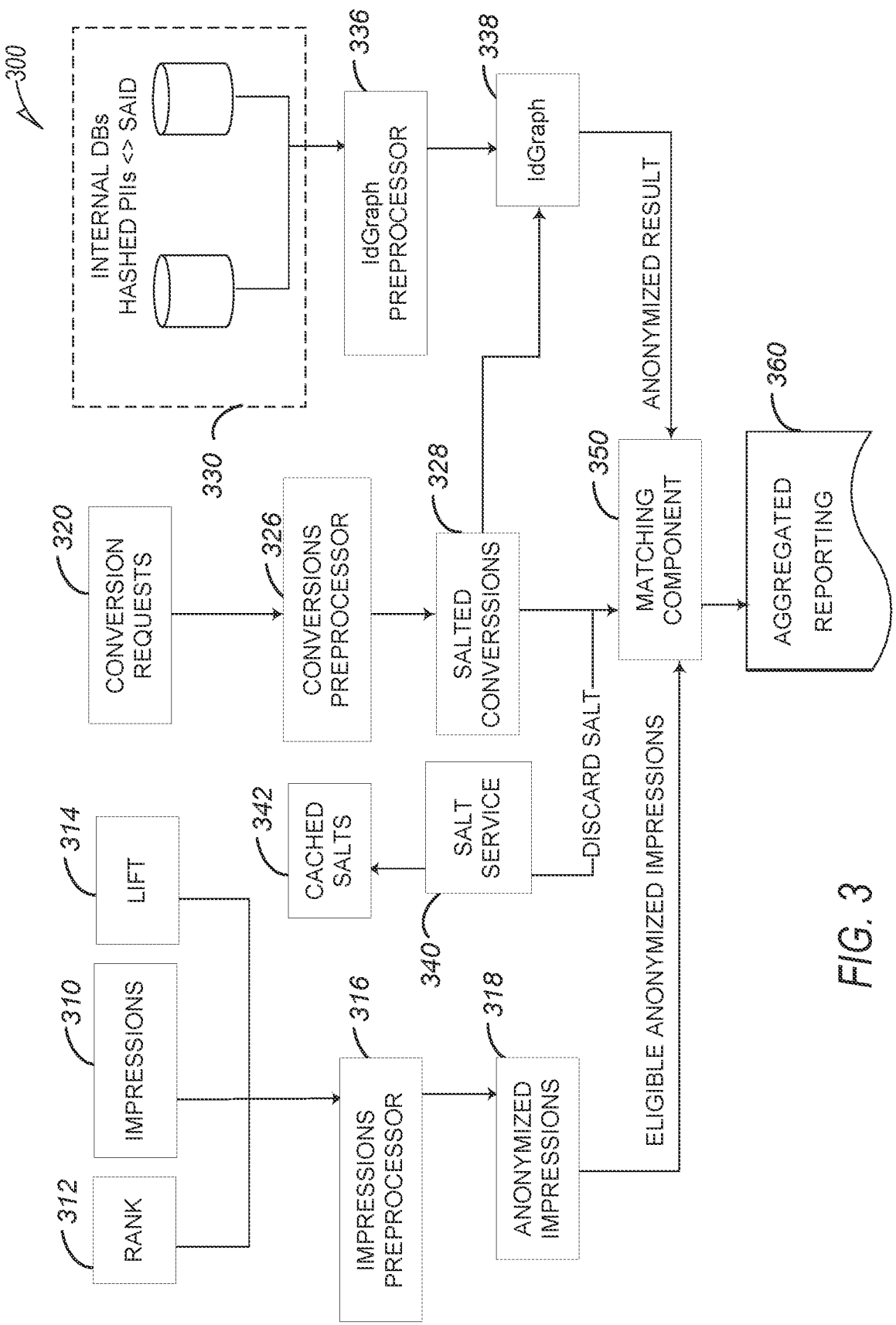
FIG. 3 is a diagrammatic representation of the design of an attribution service, in accordance with some examples.

FIG. 3 is a diagrammatic representation 300 of the design of an attribution service, such as, for example, the privacy safe attribution service 208 of FIG. 2. It will be noted that the methodology described herein can be used advantageously in any context where an app displays to users external content that can be acted upon by the users to cause events associated with the external content in the third party system that provides the external content to the app. FIG. 3 is described with respect to an example where external content is ads and where the delivery system is the messaging system.

The attribution service, as described herein, draws on the principles of the attribution solution surrounding a system powered by the privacy safe properties of salted hash and by machine learning (ML) techniques for matching user identifiers from conversion requests with respective particular user profile identifiers in the messaging system. An ML-powered system for matching user identifiers from conversion requests with respective particular user profile identifiers in the messaging system is referred to as an IdGraph for the purposes of this description. The IdGraph is identified in FIG. 3 by reference numeral 338. The hybrid solution that employs machine learning techniques together with salted hash makes it possible to provide a desirable match rate of IdGraph while performing the matching process in a privacy safe manner.

The attribution process described with reference to FIG. 3 includes three phases—preprocessing, matching, and reporting. The preprocessing entails anonymizing data that originates from three main sources. One source, which is identified in FIG. 3 by reference numeral 320, includes records of conversion requests received from an off-platform system (from the external content provider system 130 of FIG. 1, for example), in which certain fields include PII, such as email addresses, Internet Protocol (IP) addresses, or cookies. A second source of data is one or more databases 330, which store user profiles of users of the messaging system and other known identifiers that correlate with individual users represented by the user profiles. Such other known identifiers include respective email addresses, IP addresses, phone numbers, or the like. The databases, in addition to the data representing and associated with users of the messaging system may store mappings between user identifiers and respective hashed values of associated PII, such as mappings between user identifiers and respective hashed values of associated email addresses (expressed in FIG. 3 as $SAID_1 < > SHE_1$) and/or mappings between user identifiers and respective hashed values of associated phone numbers (expressed in FIG. 3 as $SAID_2 < > SHP_2$), where SAID, $SAID_1$ and $SAID_2$ are user identifiers, and $SHE_1$ and $SHE_1$ are hashed email addresses. A third source of data that is being preprocessed by the attribution service, which is identified in FIG. 3 by reference numeral 310, comprises impression records that represent impressions of external content items served by the messaging system. Each impression record is tagged with a bucket identification based on bucket mappings provided by consumer components of the attribution service. Examples of consumer components include generators of rank and lift, which are identified in FIG. 3 by reference numerals 312 and 314 respectively. Lift represents an increase in the desired outcomes in response to impressions with respect to external content. Rank is a value that is used to determine the position of an external content item relative to other items of external content.

The mappings provided by consumer components of the attribution service are in the form of a filter or criteria and an associated with bucket identification. For example, as shown in FIG. 3, $serve\_item\_id_1$ is a unique impression key that is mapped to $bucket\_id_1$ by the consumer component 312. The consumer component 312 is configured to generate ranking based on the attribution determined by the attribution service. The $serve\_item\_id_2$ is another unique impression key that is mapped to $bucket\_id_2$ by the consumer component 314. The consumer component 314 is configured to generate lift based on the attribution determined by the attribution service. $Bucket\_id_1$ is determined by the consumer component 312 that is configured to generate ranking. $Bucket\_id_1$ may represent, for example, an age range for a user identified in the impression record. Bucket_id$_2$ is determined by the consumer component 314 that is configured to generate lift. Bucket_id$_2$ may represent, for example, a country for a user identified in the impression record. As explained above, an external content item can be displayed in one of the screen views generated for display by the messaging client 104, such as, for example, in a screen view presented between presentation of two media collections.

As explained above, anonymizing PII is achieved by using salt values that are generated on a daily cadence, e.g., for each Coordinated Universal Time (UTC) date. Each day, a salt service 340 caches N salt values that were generated for that specific day, where N is the number of days in a predefined lookback window (also referred to as an attribution window) for the attribution service. In the example illustrated in FIG. 3, N=2, and the salt values are S$_1$ and S$_2$. The salt values that are cached for one day before they are discarded are identified in FIG. 3 with reference numeral 342.

Impression records from the impressions source 310 can be anonymized by an impressions preprocessor 316, where a source impression record is converted into N anonymized impressions using a different salt from the salts generated on that day for each respective anonymized record. Each anonymized impression is tagged with a bucket identification as its source impression record.

An example of a source impression record and two resulting anonymized impressions is shown below.

Source impression record:
SAID$_1$: ad_id$_1$, swipe, T$_1$, serve_item_id$_1$
Mappings of impressions to buckets:
serve_item_id$_1$: bucket_id$_1$
serve_item_id$_2$: bucket_id$_2$
Anonymized impressions:
H(S$_1$, SAID$_1$): ad_id$_1$, swipe, H(S$_1$, T$_1$), bucket_id$_1$
H(S$_2$, SAID$_1$): ad_id$_1$, swipe, H(S$_2$, T$_1$), bucket_id$_1$,
where SAID$_1$ is a user identifier, ad_id$_1$ is an identifier of an external content item, swipe is an engagement operation for the external content item ad_id$_1$, T$_1$ is a time stamp, serve_item_id$_1$ is a unique impression key, bucket_id$_1$ and bucket_id$_2$ are respective bucket identifiers to which the unique impressions are mapped, and S$_1$ and S$_2$ are two salt values.

In the example described with reference to FIG. 3, the number of days in the attribution window is two. The anonymized impressions created using S$_1$ are used in matching conversion requests associated with the day on which S$_1$ and S$_2$ were generated, while the anonymized impressions created using S$_2$ are used in matching conversion requests associated with the following day. The stored anonymized impressions are identified in FIG. 3 by reference numeral 318.

IdGraph preprocessor 336 uses the N salt values to create anonymized features in the form of anonymized mappings between hashed and salted PIIs from profiles representing users in the messaging system (such as respective email addresses and phone numbers of users) and salted user identifiers. An example of anonymized features is shown below.

Anonymized features:
H(S$_1$, SHE$_1$): H(S$_1$, SAID$_1$), H(S$_1$, T$_1$)
H(S$_2$, SHE$_1$): H(S$_2$, SAID$_1$), H(S$_2$, T$_2$)
H(S$_1$, SHP$_1$): H(S$_1$, SAID$_1$), H(S$_1$, T$_1$)
H(S$_2$, SHP$_1$): H(S$_2$, SAID$_1$), H(S$_2$, T$_2$),
where SHE$_1$ is a hashed email address, SAID$_1$ is a user identifier, T$_1$ and T$_2$ are time stamps, and S$_1$ and S$_2$ are two salt values.

Conversions preprocessor 326 uses the N salt values to anonymize any PII, such as IP addresses, cookies, and timestamp values on the conversion request. Anonymized information produced by the conversions preprocessor 326 can be referred to as anonymized conversions or salted conversions. The stored salted conversions are identified in FIG. 3 by reference numeral 328. An example of a conversion record and the resulting anonymized conversion is shown below.

Conversion record:
pixel_id$_1$, cookie$_1$, SHE$_1$, SHI$_1$, T$_1$
Anonymized conversion:
pixel_id$_1$, H(S$_1$, cookie$_1$), H(S$_1$, SHE$_1$), H(S$_1$, SHI$_1$), H(S$_1$, T$_1$),
where pixel_id$_1$ is an identification of the conversion request record, cookie$_1$ is an identification of the cookie, S$_1$ is the salt value, SHE$_1$ is a hashed email address, SHI$_1$ is a hashed IP address.

In one example, the matching phase of the attribution process is not performed in real-time. A matching component is identified in FIG. 3 by reference numeral 350. Upon receiving a conversion request the associated anonymized conversion is first stored without passing it through the attribution pipeline until the matching process can be initiated. The salt service 340 discards the salt values and generates an associated event that triggers the matching process.

The matching process is performed by the attribution service at a daily cadence and includes two steps. First, the anonymized conversions, also referred to as salted conversions, are matched with the anonymized features through the IdGraph, which is identified in FIG. 3 by reference numeral 338. As explained above, the anonymized features are generated by the IdGraph preprocessor 320 using PII from profiles representing users in the messaging system. The salted conversion is generated, by the conversions preprocessor 326, based on a conversion request received on a conversion date, by anonymizing PPI of a user associated with the conversion request, using a salt value generated on the conversion date. A user match through the IdGraph 338 is performed by executing a machine learning model trained using an anonymized training data set. The machine learning model takes, as input, a salted conversion and anonymized features generated by the IdGraph preprocessor 336 and produces an anonymized result. Some examples of a salted conversion and anonymized features include hashed and salted email addresses and phone numbers of users. The anonymized result produced by the IdGraph 338 is indicative of an association between a profile in the messaging system and the conversion request.

An example of an anonymized input into the machine learning model and the anonymized result generated by the IdGraph is shown below.

Anonymized conversion:
pixel_id$_1$, H(S$_1$, cookie$_1$), H(S$_1$, SHE$_1$), H(S$_1$, SHI$_1$), H(S$_1$, T$_1$),
Anonymized features:
H(S$_1$, SHE$_1$): H(S$_1$, SAID$_1$), H(S$_1$, T$_1$)
H(S$_2$, SHE$_1$): H(S$_2$, SAID$_1$), H(S$_2$, T$_1$)
H(S$_1$, SHP$_1$): H(S$_1$, SAID$_1$), H(S$_1$, T$_2$)
H(S$_2$, SHP$_1$): H(S$_2$, SAID$_1$), H(S$_2$, T$_2$),
Anonymized result:
H(S$_1$, SAID$_1$),
where pixel_id$_1$ is an identification of the conversion request record, cookie$_1$ is an identification of the cookie, SAID$_1$ is a user identifier, T$_1$ is a time stamp, S$_1$ and S$_2$ are two salt values, SHE$_1$ is a hashed email address, SHI$_1$ is a hashed IP address. The anonymized result in this example is a hashed and salted user identifier representing a user profile in the messaging system.

The second step in the matching process is determining whether the profile indicated by the anonymized result generated by the IdGraph 338 can be connected to an impression that occurred within the attribution window. A matching component used at the second step is identified in FIG. 3 by reference numeral 350.

The matching component 350 matches the anonymized result generated by the IdGraph 338 with eligible anonymized impressions. An anonymized impression is eligible to be matched with an anonymized result generated with respect to a conversion request received on a conversion date are those anonymized impressions that were generated using a salt value generated for the conversion date. If there is an anonymized impression that can be matched with a profile indicated by the anonymized result generated by the IdGraph 338, the attribution service determines a bucket identification associated with that anonymized impression and increases the count for that bucket. Attribution is then reported at the aggregate level. For example, as shown in FIG. 3, attribution is reported by the number of respective conversions associated with bucket_id$_1$ and bucket_id$_2$, as shown below.

Aggregated reporting:
bucket_id$_1$: 1
bucket_id$_2$: 0

Aggregated reporting is identified in FIG. 3 by reference numeral 360.

As stated above, the salt service 340 generates random salts on a daily cadence.

Furthermore, the salt service 340 discards the anonymized values that correspond to a date past the current attribution window. For example, where the number of days in the attribution window is two, and where the anonymized impressions created using $S_1$ are used in matching conversion requests associated with the day on which $S_1$ and $S_2$ were generated, while the anonymized impressions created using $S_2$ are used in matching conversion requests associated with the following day, the anonymized impressions created using $S_1$ are discarded two days later and the anonymized impressions created using $S_1$ are discarded three days later. In some examples, each salt value is associated with an identifier which is equal to or is derived from the UTC timestamp of that day.

Process Flow

Figure 4:
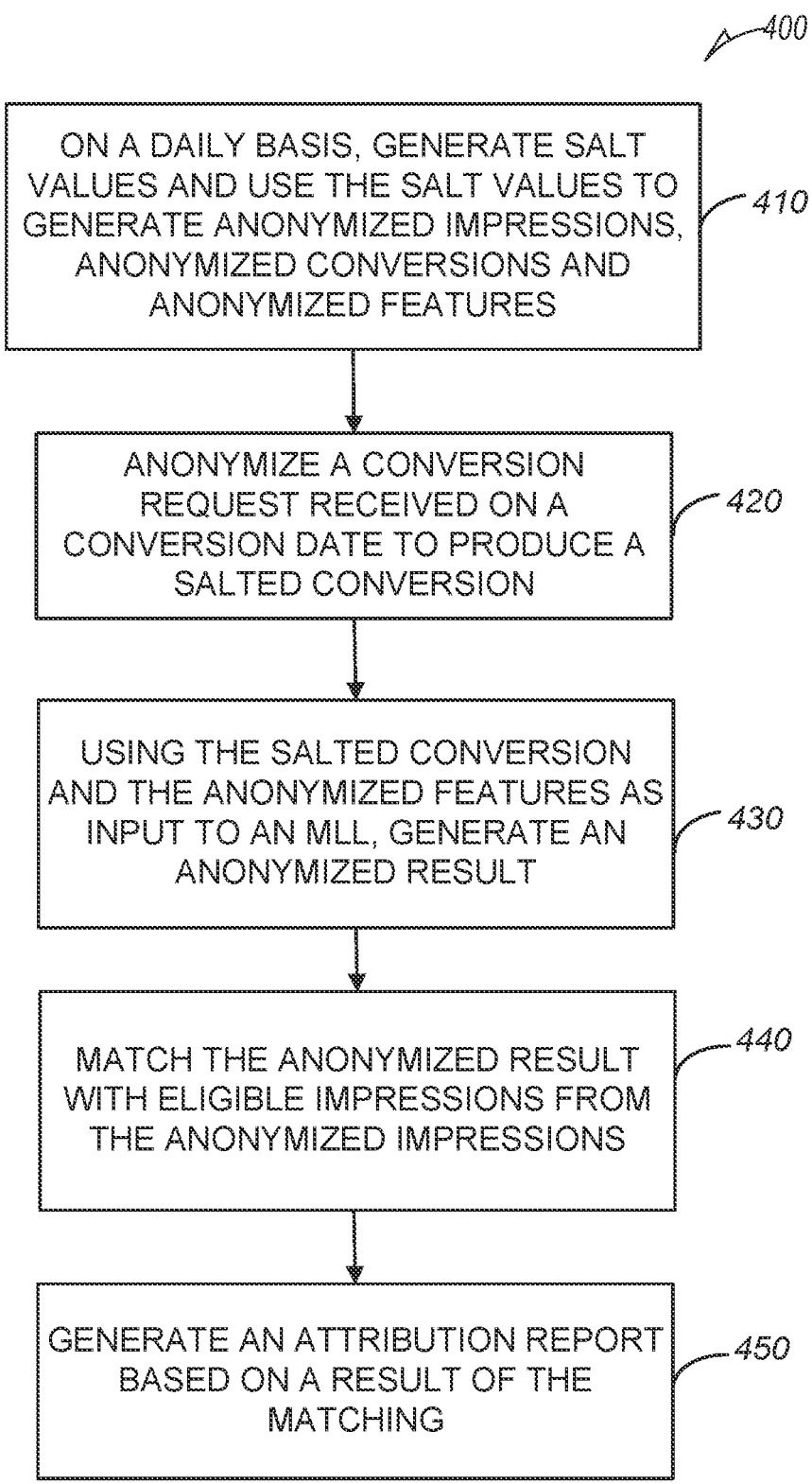
FIG. 4 is a flowchart of a method for privacy safe anonymized identity matching, in accordance with some examples.

FIG. 4 is a flowchart of a method 400 for privacy safe anonymized identity matching, in accordance with some examples. The method 400 may be performed by processing logic that may comprise hardware (e.g., dedicated logic, programmable logic, microcode, etc.), software, or a combination of both. In one example embodiment, the processing logic resides at the messaging client 104 and/or the application servers 112 of FIG. 1.

Although the described flowchart can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems. The method 400 commences with operation 410.

At operation 410, the salt service 340 of FIG. 3 generates, daily, salt values that are used to generate anonymized impressions, anonymized conversions, and anonymized features. The number of salt values generated on the daily basis is a number of days in an attribution window. Anonymized impressions comprise anonymized PII from impression records, the anonymized conversions comprise anonymized PII from conversion requests, and anonymized features comprise anonymized PII from profiles in a messaging system. The impression records and the conversion requests are associated with an external content item displayed by the messaging system. In one example, the external content item and the messaging system are provided by distinct entities. At operation 420, on a date referred to as a conversion date, the conversions preprocessor 326 of FIG. 3 generates a salted conversion by anonymizing PII of a user associated with a conversion request received on the conversion date, using a salt value generated on the conversion date. The salted conversion is stored until the salt values are discarded. The discarding of salt values is an event that triggers a matching process comprising generating an anonymized result and then matching the anonymized result with eligible anonymized impressions.

At operation 430, the anonymized conversion is provided, as input, to a ML model (MLM) that powers the IdGraph 338 of FIG. 3. The MLM is trained using an anonymized training data set. Also provided as input to the machine learning model that powers the IdGraph 338 are the anonymized features that were anonymized by the IdGraph preprocessor 336 of FIG. 3 using the salt value generated on the conversion date. Based on the anonymized conversion and the anonymized features, the IdGraph 338 generates an anonymized result. The anonymized result is indicative of an association between a profile in the messaging system and the conversion request.

At operation 440, the matching component 350 of FIG. 3 matches the anonymized result with eligible anonymized impressions to determine whether a profile represented by the anonymized result is associated with any of the eligible anonymized impressions. As explained above, an anonymized impression is eligible to be matched with an anonymized result generated with respect to a conversion request received on a conversion date are those anonymized impressions that were generated using a salt value generated for the conversion date. The eligible anonymized impressions are tagged with respective bucket identifiers. The result of the matching is in the form of a bucket identifier associated with the eligible anonymized impression that has been determined as associated with the anonymized result produced by the IdGraph 338. At operation 450, an attribution report is generated based on the result of the matching, by increasing a count associated with the bucket identifier. In one example, the bucket identifier is mapped to a characteristic of the profile in the messaging system, such as a country of a user represented by the profile.

While the example of generating these salt values describes a daily cadence for generating salt values, where the attribution window is divided into days, the methodology described herein can be used beneficially in a system where an attribution window is divided into time periods other than one day—a week or two days, or 12 hours, for example. The salt values would then be generated on a cadence corresponding to a time period, into which the attribution window is divided.

Machine Architecture

Figure 5:
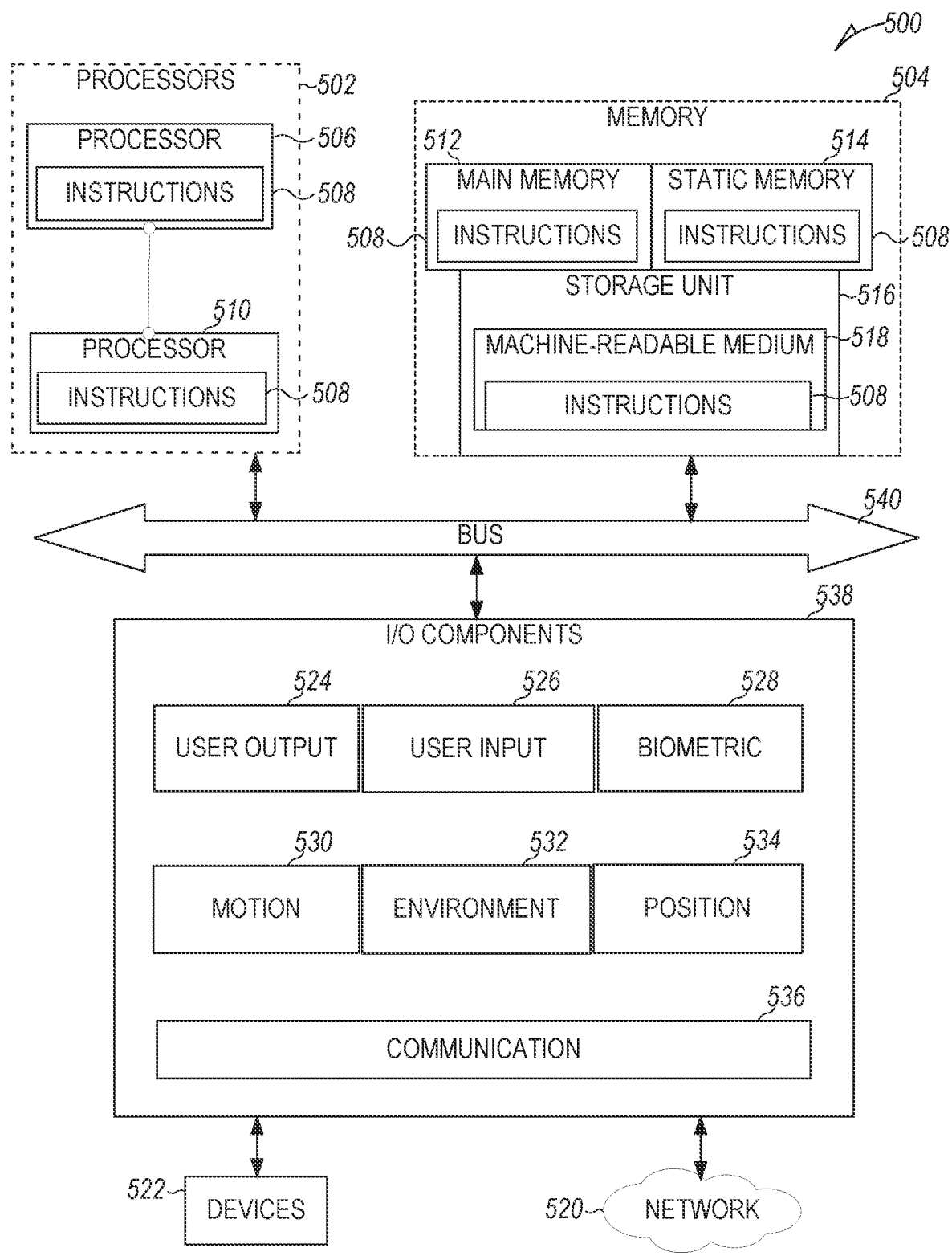
FIG. 5 is a diagrammatic representation of a machine in the form of a computer system, in accordance with some examples within which a set of instructions may be executed for causing the machine to perform any one or more of the methodologies discussed herein, in accordance with some examples.

FIG. 5 is a diagrammatic representation of the machine 500 within which instructions 508 (e.g., software, a program, an application, an applet, an app, or other executable code) for causing the machine 500 to perform any one or more of the methodologies discussed herein may be executed. For example, the instructions 508 may cause the machine 500 to execute any one or more of the methods described herein. The instructions 508 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 508, sequentially or otherwise, that specify actions to be taken by the machine 500. Further, while only a single machine 500 is illustrated, the term "machine" shall also be taken to include a collection of machines that individually or jointly execute the instructions 508 to perform any one or more of the methodologies discussed herein. The machine 500, for example, may comprise the client device 102 or any one of a number of server devices forming part of the messaging server system 108. In some examples, the machine 500 may also comprise both client and server systems, with certain operations of a particular method or algorithm being performed on the server-side and with certain operations of the particular method or algorithm being performed on the client-side.

The machine 500 may include processors 502, memory 504, and input/output I/O components 538, which may be configured to communicate with each other via a bus 540. In an example, the processors 502 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 506 and a processor 510 that execute the instructions 508. The term "processor" is intended to include multi-core processors that may comprise two or more independent processors (sometimes referred to as "cores") that may execute instructions contemporaneously. Although FIG. 5 shows multiple processors 502, the machine 500 may include a single processor with a single-core, a single processor with multiple cores (e.g., a multi-core processor), multiple processors with a single core, multiple processors with multiples cores, or any combination thereof.

The memory 504 includes a main memory 512, a static memory 514, and a storage unit 516, both accessible to the processors 502 via the bus 540. The main memory 504, the static memory 514, and storage unit 516 store the instructions 508 embodying any one or more of the methodologies or functions described herein. The instructions 508 may also reside, completely or partially, within the main memory 512, within the static memory 514, within machine-readable medium 518 within the storage unit 515, within at least one of the processors 502 (e.g., within the Processor's cache memory), or any suitable combination thereof, during execution thereof by the machine 500.

The I/O components 538 may include a wide variety of components to receive input, provide output, produce output, transmit information, exchange information, capture measurements, and so on. The specific I/O components 538 that are included in a particular machine will depend on the type of machine. For example, portable machines such as mobile phones may include a touch input device or other such input mechanisms, while a headless server machine will likely not include such a touch input device. It will be appreciated that the I/O components 538 may include many other components that are not shown in FIG. 5. In various examples, the I/O components 538 may include user output components 524 and user input components 526. The user output components 524 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 526 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 538 may include biometric components 528, motion components 530, environmental components 532, or position components 534, among a wide array of other components. For example, the biometric components 528 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 530 include acceleration sensor components (e.g., accelerometer), gravitation sensor components, rotation sensor components (e.g., gyroscope).

The environmental components 532 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 534 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 538 further include communication components 536 operable to couple the machine 500 to a network 520 or devices 522 via respective coupling or connections. For example, the communication components 536 may include a network interface Component or another suitable device to interface with the network 520. In further examples, the communication components 536 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 522 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 536, such as location via Internet Protocol (IP) geolocation, location via Wi-Fi® signal triangulation, location via detecting an NFC beacon signal that may indicate a particular location, and so forth.

The various memories (e.g., main memory 512, static memory 514, and memory of the processors 502) and storage unit 516 may store one or more sets of instructions and data structures (e.g., software) embodying or used by any one or more of the methodologies or functions described herein. These instructions (e.g., the instructions 508), when executed by processors 502, cause various operations to implement the disclosed examples.

The instructions 508 may be transmitted or received over the network 520, using a transmission medium, via a network interface device (e.g., a network interface component included in the communication components 536) and using any one of several well-known transfer protocols (e.g., hypertext transfer protocol (HTTP)). Similarly, the instructions 608 may be transmitted or received using a transmission medium via a coupling (e.g., a peer-to-peer coupling) to the devices 522.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices: magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   on a daily basis, generating salt values and using the salt values to generate anonymized impressions, anonymized conversions and anonymized features, the anonymized impressions comprising anonymized personally identifiable information (PII) from impression records, the anonymized conversions comprising anonymized PII from conversion requests and anonymized features comprising anonymized PII from profiles in a messaging system, the impression records and the conversion requests associated with an external content item displayed by the messaging system;
   generating a salted conversion by anonymizing PII associated with a conversion request received on a conversion date, using a salt value generated on the conversion date;
   providing the salted conversion and the anonymized features as input to a machine learning model (MLM) and generating, by the MLM, an anonymized result indicative of an association between a profile in the messaging system and the conversion request, the anonymized features anonymized using the salt value generated on the conversion date;
   matching the anonymized result with eligible anonymized impressions from the anonymized impressions, the eligible anonymized impressions anonymized using respective salt values generated for the conversion date; and
   generating an attribution report based on a result of the matching.

2. The method of claim 1, comprising discarding the salt values, wherein the generating of the anonymized result is performed after the discarding of the salt values.

3. The method of claim 1, wherein a number of salt values generated on the daily basis is a number of days in an attribution window.

4. The method of claim 1, wherein the eligible anonymized impressions are tagged with respective bucket identifiers, the method comprising:
   determining that the result of the matching indicates a first bucket identifier from the respective bucket identifiers, wherein the generating of the attribution report comprises increasing a count associated with the first bucket identifier.

5. The method of claim 4, wherein the first bucket identifier is mapped to a characteristic of the profile in the messaging system.

6. The method of claim 1, wherein the PH associated with the conversion request received on the conversion date comprises one or more from an email address and an Internet protocol (IP) address.

7. The method of claim 1, comprising storing the salted conversion until detecting an event that triggers a matching process, the matching process comprising the generating, by the MLM, the anonymized result and the matching the anonymized result with the eligible anonymized impressions.

8. The method of claim 7, wherein the event that triggers the matching process is discarding the salt values.

9. The method of claim 1, wherein the impression records store information related to presentation of external content to users of the messaging system.

10. The method of claim 1, wherein the external content item and the messaging system are provided by distinct entities.

11. A system comprising:
    one or more processors; and
    a non-transitory computer readable storage medium comprising instructions that when executed by the one or processors cause the one or more processors to perform operations comprising:
    on a daily basis, generating salt values and using the salt values to generate anonymized impressions, anonymized conversions and anonymized features, the anonymized impressions comprising anonymized personally identifiable information (PII) from impression records, the anonymized conversions comprising anonymized PII from conversion requests and anonymized features comprising anonymized PII from profiles in a messaging system, the impression records and the conversion requests associated with an external content item displayed by the messaging system;
    generating a salted conversion by anonymizing PI associated with a conversion request received on a conversion date, using a salt value generated on the conversion date;
    providing the salted conversion and the anonymized features as input to a machine learning model (MLM) and generating, by the MLM, an anonymized result indicative of an association between a profile in the messaging system and the conversion request, the anonymized features anonymized using the salt value generated on the conversion date;
    matching the anonymized result with eligible anonymized impressions from the anonymized impressions, the eligible anonymized impressions anonymized using respective salt values generated for the conversion date; and
    generating an attribution report based on a result of the matching.

12. The system of claim 11, wherein the operations caused by instructions executed by the one or processors further include: discarding the salt values, wherein the generating of the anonymized result is performed after the discarding of the salt values.

13. The system of claim 11, wherein a number of salt values generated on the daily basis is a number of days in an attribution window.

14. The system of claim 11, wherein the eligible anonymized impressions are tagged with respective bucket identifiers, wherein the operations caused by instructions executed by the one or processors further include:
    determining that the result of the matching indicates a first bucket identifier from the respective bucket identifiers, wherein the generating of the attribution report comprises increasing a count associated with the first bucket identifier.

15. The system of claim 14, wherein the first bucket identifier is mapped to a characteristic of the profile in the messaging system.

16. The system of claim 11, wherein the PII associated with the conversion request received on the conversion date comprises one or more from an email address and an Internet protocol (IP) address.

17. The system of claim 11, wherein the operations caused by instructions executed by the one or processors further include: storing the salted conversion until detecting an event that triggers a matching process, the matching process comprising the generating, by the MLM, the anonymized result and the matching the anonymized result with the eligible anonymized impressions.

18. The system of claim 17, wherein the event that triggers the matching process is discarding the salt values.

19. The system of claim 11, wherein the impression records store information related to presentation of external content to users of the messaging system.

20. A machine-readable non-transitory storage medium having instruction data executable by a machine to cause the machine to perform operations comprising:

on a daily basis, generating salt values and using the salt values to generate anonymized impressions, anonymized conversions and anonymized features, the anonymized impressions comprising anonymized personally identifiable information (PII) from impression records, the anonymized conversions comprising anonymized PI from conversion requests and anonymized features comprising anonymized PII from profiles in a messaging system, the impression records and the conversion requests associated with an external content item displayed by the messaging system;

generating a salted conversion by anonymizing PI associated with a conversion request received on a conversion date, using a salt value generated on the conversion date;

providing the salted conversion and the anonymized features as input to a machine learning model (MLM) and generating, by the MLM, an anonymized result indicative of an association between a profile in the messaging system and the conversion request, the anonymized features anonymized using the salt value generated on the conversion date;

matching the anonymized result with eligible anonymized impressions from the anonymized impressions, the eligible anonymized impressions anonymized using respective salt values generated for the conversion date; and generating an attribution report based on a result of the matching.

* * * * *

UNITED STATES PATENT AND TRADEMARK OFFICE
CERTIFICATE OF CORRECTION

PATENT NO. : 11,899,823 B2  
APPLICATION NO. : 17/357559  
DATED : February 13, 2024  
INVENTOR(S) : Chopra et al.

Page 1 of 1

It is certified that error appears in the above-identified patent and that said Letters Patent is hereby corrected as shown below:

In the Claims

In Column 20, Line 1, in Claim 6, delete "PH" and insert --PII-- therefor

In Column 20, Line 36, in Claim 11, delete "PI" and insert --PII-- therefor

In Column 22, Line 4, in Claim 20, delete "PI" and insert --PII-- therefor

In Column 22, Line 9, in Claim 20, delete "PI" and insert --PII-- therefor

Signed and Sealed this  
Twenty-ninth Day of April, 2025

Coke Morgan Stewart  
*Acting Director of the United States Patent and Trademark Office*